(12) United States Patent
Mohanty

(10) Patent No.: US 12,381,870 B2
(45) Date of Patent: *Aug. 5, 2025

(54) SECURE USER AUTHENTICATION LEVERAGING QUANTUM KEY AND STEGANOGRAPHY

(71) Applicant: BANK OF AMERICA CORPORATION, Charlotte, NC (US)

(72) Inventor: Swetapadma Mohanty, Telangana (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/668,209

(22) Filed: May 19, 2024

(65) Prior Publication Data

US 2024/0305627 A1 Sep. 12, 2024

Related U.S. Application Data

(63) Continuation of application No. 17/678,363, filed on Feb. 23, 2022, now Pat. No. 12,034,718.

(51) Int. Cl.
*H04L 9/40* (2022.01)
*H04L 9/08* (2006.01)

(52) U.S. Cl.
CPC ........ *H04L 63/0853* (2013.01); *H04L 9/0852* (2013.01); *H04L 2209/16* (2013.01)

(58) Field of Classification Search
CPC ............... H04L 63/0853; H04L 9/0852; H04L 2209/16; H04L 9/0662; H04L 9/321; H04L 2463/082; H04L 63/08; H04L 63/083; H04L 63/0838; H04L 63/0861; H04L 63/18
See application file for complete search history.

(56) References Cited

U.S. PATENT DOCUMENTS

| | | | |
|---|---|---|---|
| 5,937,066 A | 8/1999 | Gennaro et al. | |
| 7,657,489 B2 | 2/2010 | Stambaugh | |
| 8,095,795 B2 | 1/2012 | Levy | |
| 8,190,713 B2 | 5/2012 | Rhoads | |
| 8,751,801 B2 | 6/2014 | Harris et al. | |
| 9,049,010 B2 | 6/2015 | Jueneman et al. | |
| 9,191,198 B2 | 11/2015 | Harrison et al. | |

(Continued)

OTHER PUBLICATIONS

Simulation Modelling Practice and Theory, vol. 121, Dec. 2022, 102651.

*Primary Examiner* — Abiy Getachew
(74) *Attorney, Agent, or Firm* — Moore & Van Allen PLLC; Anup Iyer

(57) ABSTRACT

Secure user authentication is provided by leveraging the use of quantum keys, steganography and random user keys/passcodes. Random user passcodes limit both the entity's control over the user and potential exposure of the passcode to wrongdoers. From a security standpoint, use of quantum keys and quantum communication channels heightens security during transmission of keys, such that if a wrongdoer would attempt to hack the transmission, the quantum sequence would break, which would not only prevent the hack but also result in remedial actions, such as preventing the authentication-requiring event, providing alerts and the like. Further, use of steganography also heightens security by preventing exposure to the keys during transmission and/or while the authentication process is occurring on the display of the user's mobile device.

20 Claims, 5 Drawing Sheets

(56) References Cited

U.S. PATENT DOCUMENTS

| | | |
|---|---|---|
| 9,847,882 B2 | 12/2017 | Kim |
| 10,419,438 B2 | 9/2019 | Smith et al. |
| 10,461,936 B2 | 10/2019 | Tjhai et al. |
| 10,644,883 B2 | 5/2020 | Ahn |
| 2006/0129811 A1 | 6/2006 | Fiske |
| 2007/0067642 A1 | 3/2007 | Singhal |
| 2008/0307515 A1 | 12/2008 | Drokov et al. |
| 2021/0365938 A1 | 11/2021 | Radu |
| 2022/0215279 A1 | 7/2022 | Rahman |
| 2023/0232220 A1 | 7/2023 | Low et al. |
| 2023/0385677 A1 | 11/2023 | Rosenkranz et al. |
| 2024/0062169 A1 | 2/2024 | Baughman et al. |

SECURE USER AUTHENTICATION LEVERAGING QUANTUM KEY AND STEGANOGRAPHY

CROSS-REFERENCE TO RELATED APPLICATION

This application is a continuation of and claims priority to U.S. patent application Ser. No. 17/678,363, filed on Feb. 23, 2022, and of the same title; the contents of which are also incorporated herein by reference.

FIELD OF THE INVENTION

The present invention is related to user authentication and, more specifically, leveraging quantum key and steganography to provide a secure means for user authentication.

BACKGROUND

Many multi-factor authentication methods provide for the use of One Time Passwords (OTPs). For example, a user desiring to be authenticated for purposes of gaining access to an application, service or the like or conducting an event may request an OTP, which is then communicated to a mobile communication device previously registered to the user. Once the user enters the OTP and it is confirmed that the OTP matches the OTP that was sent, the user is deemed to be authenticated.

However, the use of such OTPs is not without security concern since OTPs are susceptible to being misappropriated by wrongdoers. For example, unsuspecting users may be duped into sharing an OTP with a wrongdoer. In other instances, wrongdoers may gain access to OTPs that are haphazardly displayed as a notification on an otherwise locked mobile communication device. Furthermore, the communication link used to transmit an OTP may be unsecure, placing the OTP in jeopardy of being misappropriated by a hacker or the like.

Moreover, conventional OTPs are generated and otherwise in control of the entity requesting the authentication. Such practice not only gives the entity requesting the authentication more control over the user but also lends itself to reliability issues if technical issues exist (e.g., servers providing the OTPs are down or the like).

Therefore, a need exists to develop systems, methods and the like that provide for secure user authentication. The desired systems, methods and like should alleviate or, in some instances, eliminate the security threats posed by conventional OTPs. In this regard, the desired systems, methods and like should alleviate the threat of a password/code being misappropriated either during transmission or through inadvertent exposure. Additionally, the desired systems, methods and the like should eliminate the need for the password/code to be generated by the entity requiring the authentication, thereby, limiting the entity's control over the user and issues related to reliability in generating the passwords/codes.

BRIEF SUMMARY

The following presents a simplified summary of one or more embodiments of the invention in order to provide a basic understanding of such embodiments. This summary is not an extensive overview of all contemplated embodiments and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing secure user authentication that leverages quantum keys, steganography and random user keys/passcodes. Random user keys provide for the user to create a random key/passcode each time an authentication process occurs. As a result of random user keys, the entity requesting authentication is no longer responsible for generating the passcode and, thus, limits the entity's control over the user. From a security standpoint, use of quantum keys and quantum communication channels heightens security during transmission of keys, such that if a wrongdoer would attempt to hack the transmission (i.e., copy the keys or the like), the quantum sequence would break, which would not only prevent the hack but also result in remedial actions, such as preventing the authentication-requiring event, providing alerts and the like. Further, use of steganography also heightens security by preventing exposure to the keys during transmission and/or while the authentication process is occurring on the display of the user's mobile device.

Specifically, the invention provides for the authentication process to be initiated by the user inputting a random user key (e.g., passcode, number, word or the like) which is transmitted, along with event information, to a quantum computing platform. In response to receiving the random key and event information, the quantum computer generates two or more qubits and, using the qubits and the random key, creates a quantum sequence. Subsequently, a classical computing platform (or a classical computing platform in conjunction with the quantum computing platform) uses the quantum sequence to create a weblink and steganography is implemented to obfuscate the weblink within a digital image or video file. A Multimedia Message Service (MMS) message is generated that contains the digital image/video file, which is then communicated to a previously registered user's mobile communication device. Upon receipt of the MMS, the mobile communication displays a notification requiring the user to unlock the mobile device (i.e., provide user credentials) to open MMS message. Once opened, the MMS asks for the user to re-enter their random user key to authenticate the MMS and make the image or video visible. Once the user activates (e.g., "clicks on") the image or video, the MMS is deemed to be authenticated, which prompts the conversion of the image/video file to the weblink and the extraction of the random user key from the quantum sequence. If the random user key re-entered by the user upon opening the MMS matches the random user key in the quantum sequence in the weblink, the user is deemed to be authenticated and notification of such, along with the event information, is transmitted to the entity requiring the authentication.

A system for secure user authentication defines first embodiments of the invention. The system includes a mobile communication device having a first computing platform including a first memory, one or more first processing devices in communication with the first memory, and a user authentication application executable by at least one of the one or more first processing devices. The user authentication application is configured to, in response to a user initiating an event requiring user authentication, prompt the user to input a random user key, and, in response to prompting the user, receive a first user input of the random user key and communicate the random user key and event information to a quantum computing platform.

The system additionally includes the quantum computing platform having a quantum memory, one or more quantum processors in communication with the quantum memory, and a quantum sequence generator executable by at least one of the quantum processors. The quantum sequence generator is configured to, in response to receiving the random user key and event information, generate a quantum sequence that comprises a plurality of quantum keys and the random user key.

Further, the system includes a classical computing platform having a second memory, one or more second processing devices in communication with the second memory, and a Multimedia Messaging Service (MMS) message generator executable by at least one of the second computing devices and configured to (i) generate a weblink including the quantum sequence and the event information, (ii) apply steganography to the weblink to create an image file or video file, (iii) generate an MMS message including the image file or video file, and (iv) communicate the MMS message to the mobile communication device.

In response to the mobile communication device receiving the MMS message, the authentication application is further configured to, in response to the user viewing and activating the MMS message, prompt the user to input the random user key, and, in response to prompting the user, receive a second user input of the random user key to authenticate the MMS message, convert the MMS message to the weblink, and extract the random user key from the weblink. Further, the authentication application is configured to authenticate the user for performing the event based on a match between the random user key extracted from the weblink and the random user key in the second user input.

In further specific embodiments of the system, the authentication application is further configured to, in response to authenticating the user for performing the event, transmit the weblink to an event processing entity over a quantum communication channel. In such embodiments the system may further include an event processing computing platform comprising a third memory one or more third processing devices in communication with the memory and an event processing application executable by at least one of the one or more third processing devices. The event processing application is configured to, in response to receiving the weblink, filter out the quantum sequence from the weblink to identify the event information and conduct the event according to the event information. In other related embodiments, the event processing application is further configured in response to, in response to determining that the quantum sequence in the weblink has been broken during transmission, cancel the event and initiate communication of an error message to the mobile communication device that prompts the user to input a different random user key.

In other specific embodiments of the system, the MMS message generator is further configured to communicate the MMS message to the mobile communication device over a quantum communication channel. In such embodiments of the system, the authentication application is further configured to, in response to determining that the quantum sequence in the weblink hidden in the image file or video file of the MMS message has been broken during transmission, initiate communication of an error message to the mobile communication device that prompts the user to input a different random user key.

In still further specific embodiments of the system, the quantum sequence generator is further configured to generate the quantum sequence that includes the plurality a quantum keys, metadata associated with each of the quantum keys and the random user key. In such embodiments of the system, (i) each of the quantum keys in the quantum sequence is followed by corresponding metadata, and (ii) the random user key is disposed in-between at least two quantum keys in the quantum sequence.

A computer-implemented method for secure user authentication defines second embodiments of the invention. The method is executed by one or more processing devices. The method includes, in response to a user initiating an event on a mobile communication device that requires user authentication, prompting the user to devise and enter a random user key, and, in response to prompting the user, receiving a first user input of the random user key and communicating the random user key and event information to a quantum computing platform.

In response to the quantum computing platform receiving the random user key and event information, the computer-implemented method further includes generating a quantum sequence including a plurality of quantum keys and the random user key. In addition, the computer-implemented method includes, generating a weblink including the quantum sequence and the event information, applying steganography to the weblink to create an image file or video file, generating an MMS message including the image file or video file, and communicating the MMS message to a user-registered mobile communication device.

In response to the mobile communication device receiving the MMS message, prompting the user to re-renter the random user key and, in response to prompting the user to re-enter the random user key, receiving a second user input of the random user key to authenticate the MMS message, converting the MMS message to the weblink and extracting the random user key from the weblink. The computer-implemented method further includes authenticating the user for performing the event based on a match between the random user key extracted from the weblink and the random user key in the second user input.

In specific embodiments the computer-implemented method further includes, in response to authenticating the user for performing the event, transmitting the weblink to an event processing entity over a quantum communication channel. In related embodiments, the computer-implemented method further includes, in response to the event processing entity receiving the weblink, filtering out the quantum sequence from the weblink to identify the event information and conduct the event according to the event information. In other related embodiments, the computer-implemented method further includes, in response to determining that the quantum sequence in the weblink has been broken during transmission, cancelling the event and initiating communication of an error message to the mobile communication device that prompts the user to input a different random user key.

In still further specific embodiments of the computer-implemented method, communicating the MMS message to the mobile communication device further includes communicating the MMS message to the mobile communication device over a quantum communication channel. In such embodiments, the computer-implemented method may further include, in response to determining that the quantum sequence in the weblink hidden in the image file or video file of the MMS message has been broken during transmission, initiating communication of an error message to the mobile communication device that prompts the user to input a different random user key.

In further specific embodiments of the computer-implemented method, generating the quantum sequence further includes generating the quantum sequence including the plurality a quantum keys, metadata associated with each of the quantum keys and the random user key. In such embodiments of the computer-implemented method (i) each quantum key in the quantum sequence is followed by corresponding metadata, and (ii) the random user key is disposed in-between at least two quantum keys in the quantum sequence.

A computer program product including a non-transitory computer-readable medium defines third embodiments of the invention. The computer-readable medium includes a first set of codes for causing a user communication device to in response to a user initiating an event requiring user authentication, (i) prompt the user to devise and enter a random user key, and in response to prompting the user to devise and enter the random user key, (ii) receive a first user input of the random user key, and (iii) communicate the random user key and event information to a quantum computing platform. Additionally, the computer-readable medium includes a second set of codes for causing a quantum computing platform to, in response to the quantum computing platform receiving the random user key and event information, generate a quantum sequence including a plurality of quantum keys and the random user key. Further, the computer-readable medium includes a third set of codes for causing a classical computing platform to, (i) generate a weblink including the quantum sequence and the event information, (ii) apply steganography to the weblink to create an image file or video file, (iii) generate an MMS message including the image file or video file, and (iv) communicate the MMS message to the mobile communication device. In addition, the computer-readable medium includes a fourth set of codes for causing a user mobile communication device to, in response to receiving the MMS message and the user viewing and activating the MMS message, (i) prompt the user to re-renter the random user key, in response to prompting the user to re-enter the random user key, (ii) receive a second user input of the random user key to authenticate the MMS message and convert the MMS message to the weblink, (iii) extract the random user key from the weblink, and (iv) authenticate the user for performing the event based on a match between the random user key extracted from the weblink and the random user key in the second user input.

In specific embodiments of the computer program product, the fourth set of codes is further configured to cause the user mobile communication device to (v) in response to authenticating the user for performing the event, transmit the weblink to an event processing entity over a quantum communication channel. In such embodiments of the computer program product, the computer-readable medium may further includes a fifth set of codes for causing an event processing entity computing platform to, in response to receiving the weblink, filter out the quantum sequence from the weblink to identify the event information and conduct the event according to the event information. In such embodiments of the computer program product, the fifth set of codes may be further configured to cause the vent processing entity computing platform to, in response to determining that the quantum sequence in the weblink has been broken during transmission, cancel the event and initiate communication of an error message to the mobile communication device that prompts the user to input a different random user key.

In other specific embodiments of the computer program product of claim 16, wherein the third set of codes are further configured to cause the classical computing platform to (v) communicate the MMS message to the mobile communication device over a quantum communication channel, and (vi) in response to determining that the quantum sequence in the weblink hidden in the image file or video file of the MMS message has been broken during transmission, initiate communication of an error message to the mobile communication device that prompts the user to input a different random user key.

In still further specific embodiments of the computer program product, the second set of codes are further configured to cause the quantum computing platform to generate the quantum sequence including the plurality a quantum keys, metadata associated with each of the quantum keys and the random user key. In such embodiments of the computer program product (i) each quantum key is followed by corresponding metadata in the quantum sequence, and (ii) the random user key is disposed in-between at least two quantum keys in the quantum sequence.

Thus, according to embodiments of the invention, which will be discussed in greater detail below, the present invention provides for secure user authentication by leveraging the use of quantum keys, steganography and user-devised random keys/passcodes. User-devised random passcodes limits both the entity's control over the user and potential exposure of the passcode to wrongdoers. From a security standpoint, use of quantum keys and quantum communication channels heightens security during transmission of keys, such that if a wrongdoer would attempt to hack the transmission (i.e., copy the keys or the like), the quantum sequence would break, which would not only prevent the hack but also result in remedial actions, such as preventing the authentication-required events, providing alerts and the like. Further, use of steganography also heightens security by preventing exposure to the keys during transmission and/or while the authentication process is occurring on the display of the user's mobile device.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
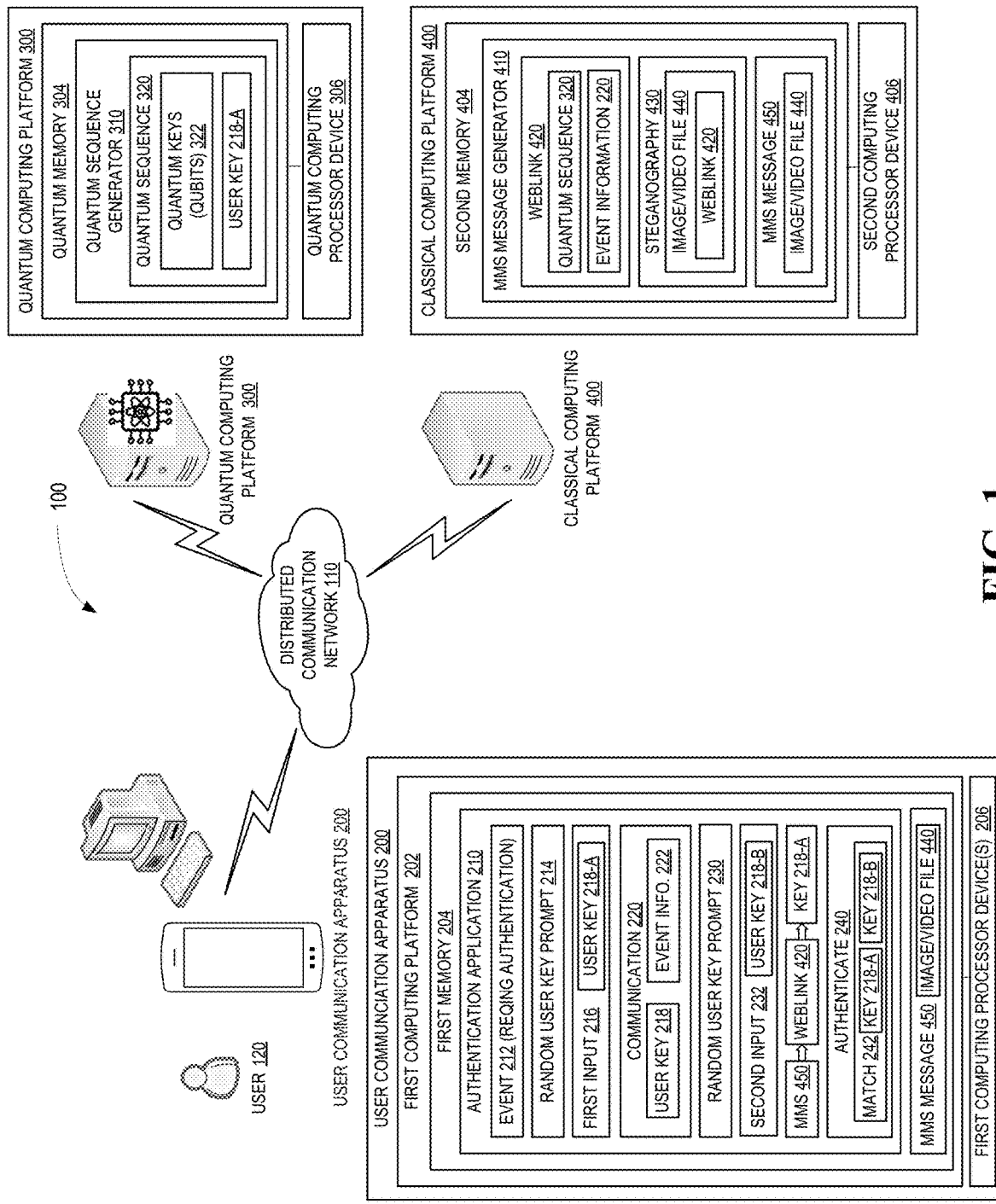
Figure 2:
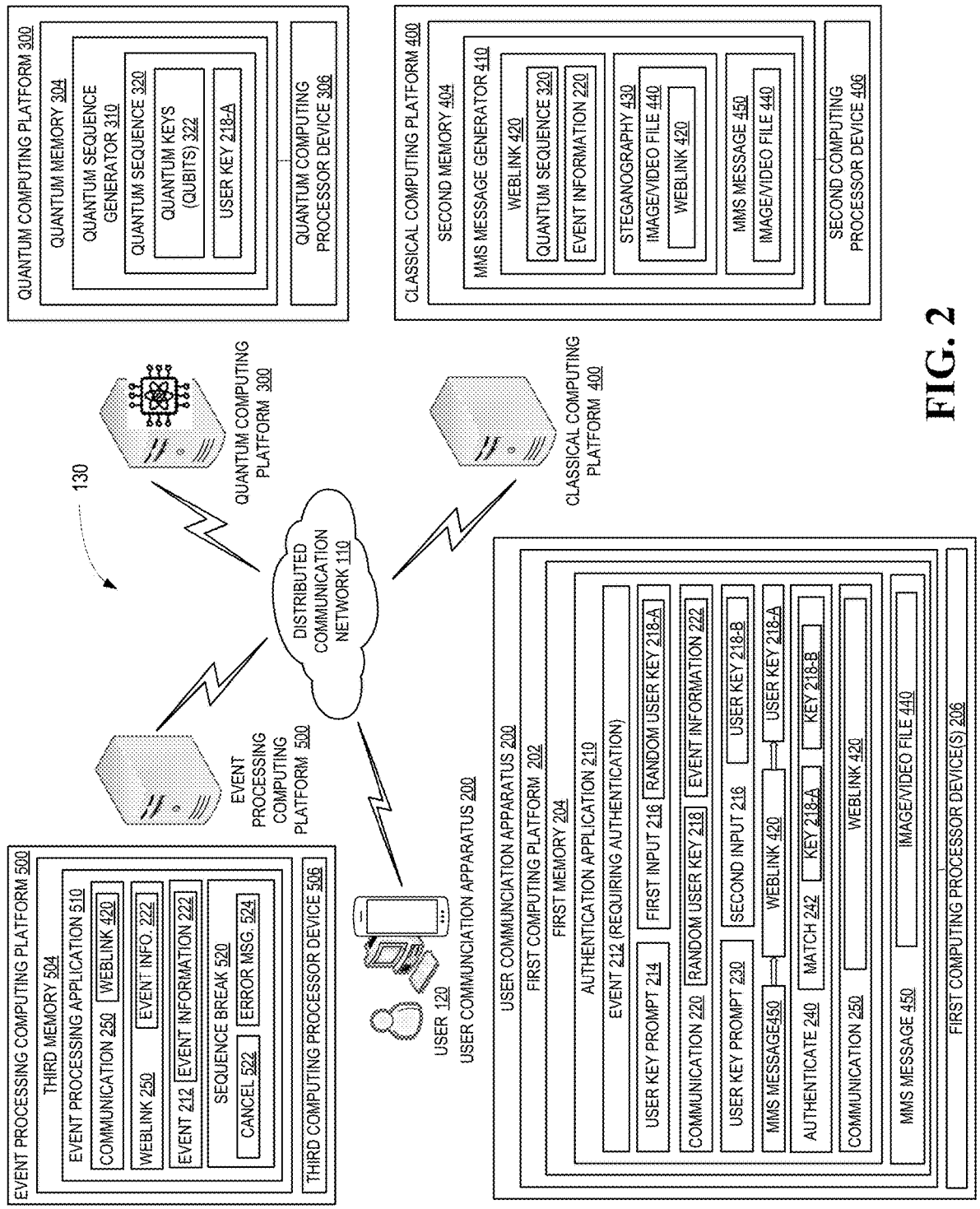
Figure 3:
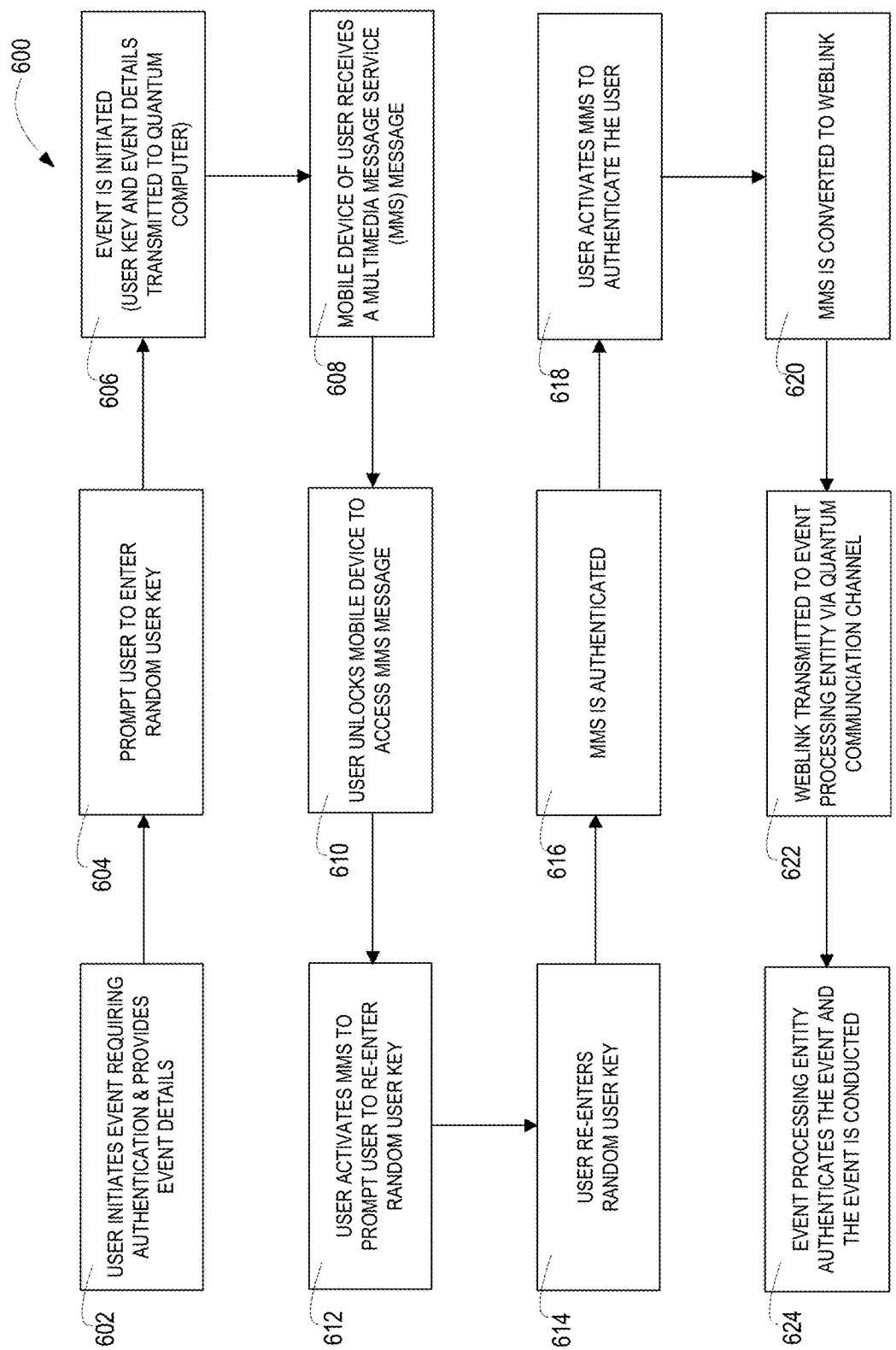
Figure 4:
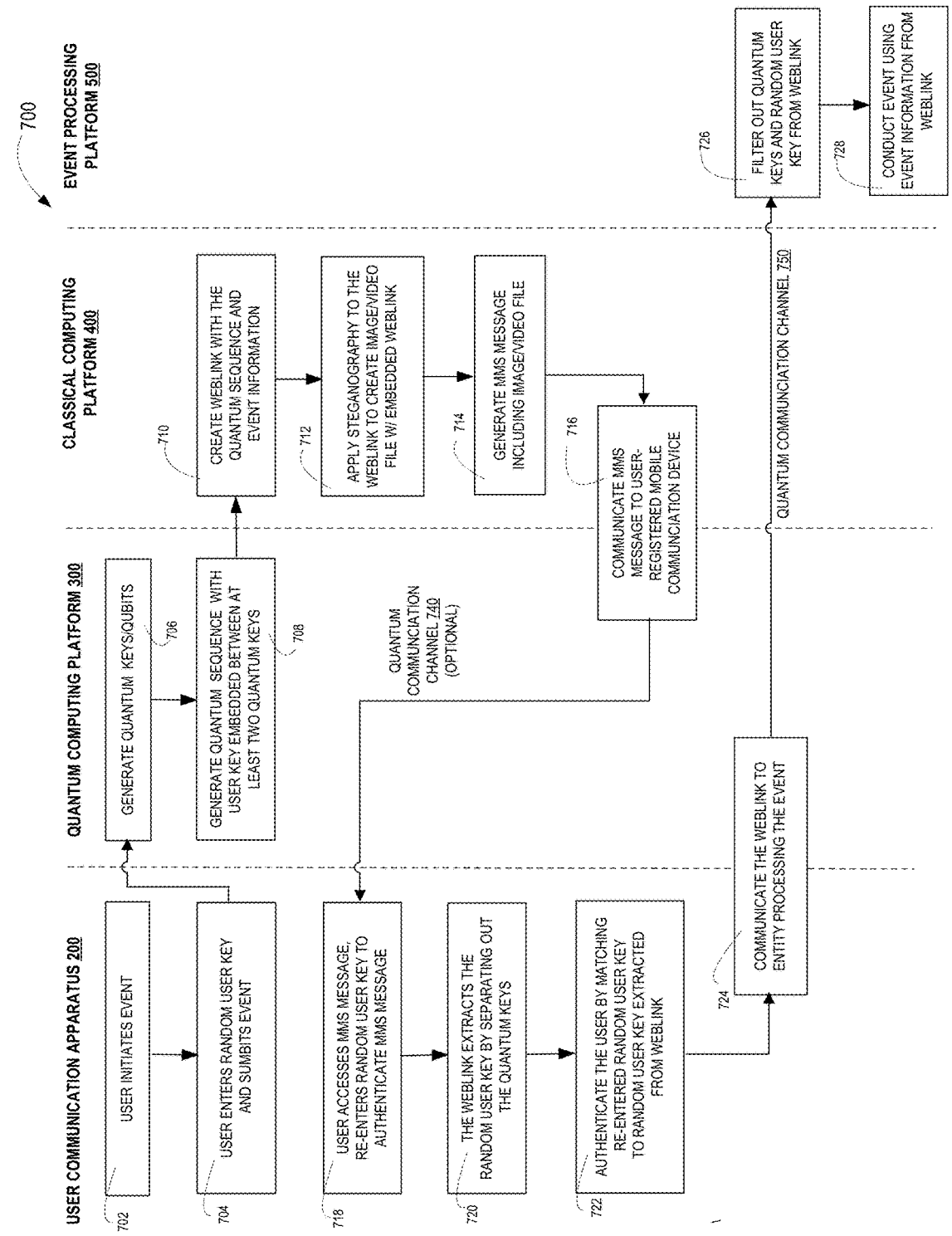
Figure 5:
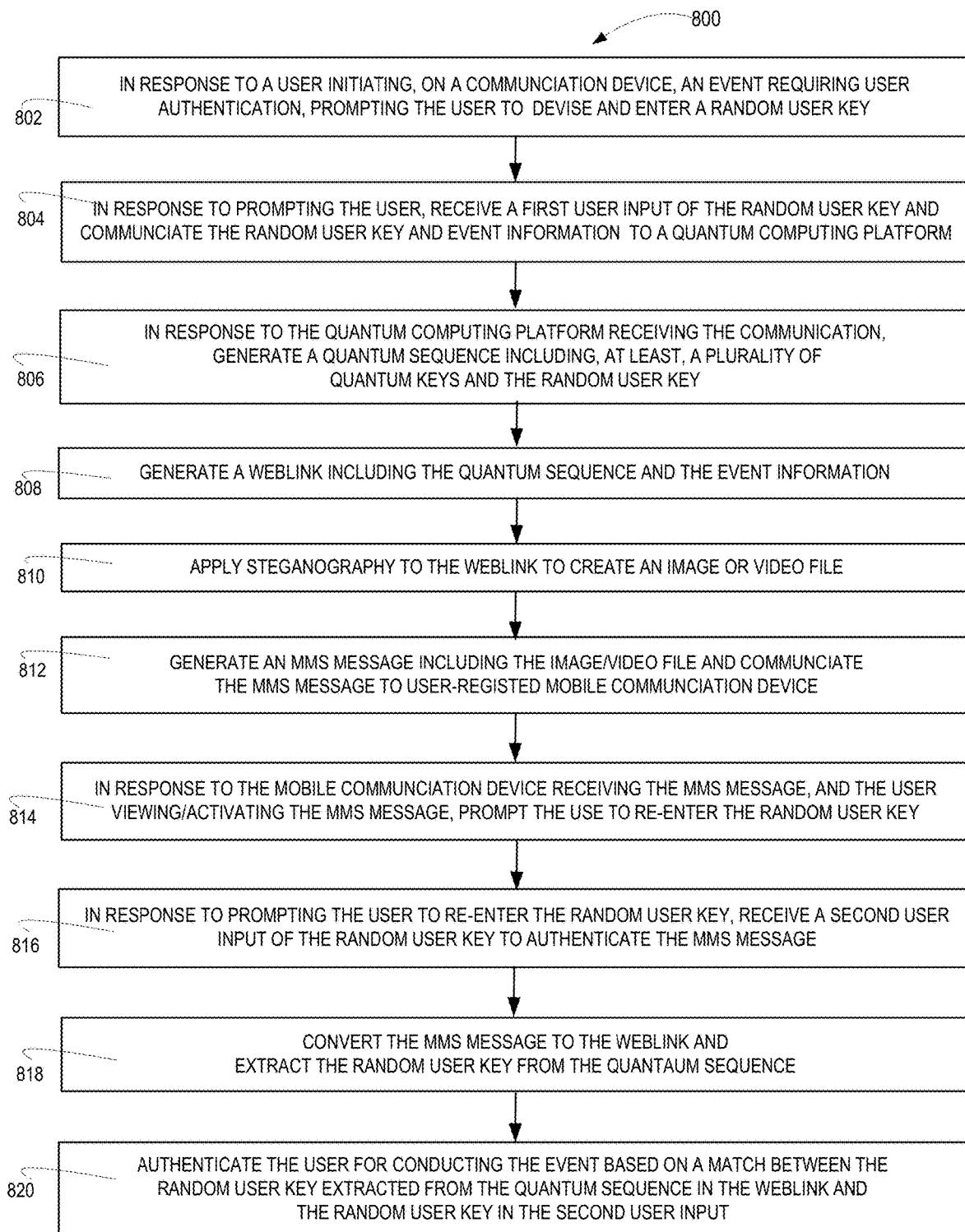

Having thus described embodiments of the disclosure in general terms, reference will now be made to the accompanying drawings, wherein:

FIG. 1 is a schematic diagram of a system for secure user authentication leveraging random user keys, steganography and quantum computing, in accordance with some embodiments of the present disclosure;

FIG. 2 is a block diagram of an alternate system for secure user authentication leveraging random user keys, steganography and quantum computing, in accordance with some embodiments of the present disclosure;

FIG. 3 is a flow diagram of a methodology for secure user authentication from the user's perspective, in accordance with some embodiments of the present disclosure;

FIG. 4 is a swim lane flow diagram of a methodology for secure user authentication leveraging random user keys, steganography and quantum computing, in accordance with embodiments of the present invention; and FIG. 5 is a flow diagram of a methodology for a secure user authentication leveraging random user keys, steganography and quantum computing, in accordance with embodiments of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one of skill in the art in view of this disclosure, the present invention may be embodied as a system, a method, a computer program product or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer-readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted or unscripted programming language such as JAVA, PERL, SMALLTALK, C++, PYTHON or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or systems. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus to cause a series of operational events to be performed on the computer or other programmable apparatus to produce a computer implemented process such that the instructions, which execute on the computer or other programmable apparatus, provide events for implementing the functions/acts specified in the flowchart and/or block diagram block or blocks. Alternatively, computer program implemented events or acts may be combined with operator or human implemented events or acts in order to carry out an embodiment of the invention.

As the phrase is used herein, a processor may be "configured to" perform or "configured for" performing a certain function in a variety of ways, including, for example, by having one or more general-purpose circuits perform the function by executing particular computer-executable program code embodied in computer-readable medium, and/or by having one or more application-specific circuits perform the function.

Thus, according to embodiments of the invention, which will be described in more detail below, systems, methods and computer program products are disclosed that provide for secure user authentication by leveraging the use of quantum keys, steganography and random user keys/passcodes. Random user keys provide for the user to devise a random key/passcode each time an authentication process occurs. As a result of random user keys, the entity requesting authentication is no longer responsible for generating the passcode and, thus, limits the entity's control over the user. From a security standpoint, use of quantum keys and quantum communication channels heightens security during transmission of keys, such that if a wrongdoer would attempt to hack the transmission (i.e., copy the keys or the like), the quantum sequence would break, which would not only prevent the hack but also result in remedial actions, such as preventing the authentication-required events, providing alerts and the like. Further, use of steganography also heightens security by preventing exposure to the keys during transmission and/or while the authentication process is occurring on the display of the user's mobile device.

Specifically, the invention provides for the authentication process to be initiated by the user inputting a random user key (e.g., passcode, number, word or the like) which is transmitted, along with event information, to a quantum computing platform. In response to receiving the random key and event information, the quantum computer generates two or more qubits and using the qubits and the random key creates a quantum sequence. Subsequently, a classical computing platform (or a classical computing platform in conjunction with the quantum computing platform) uses the quantum sequence to create a weblink and steganography is implemented to obfuscate the weblink within a digital image or video file. A Multimedia Message Service (MMS) message is generated that contains the digital image/video file, which is then communicated to a previously registered user mobile communication device. Upon receipt of the MMS message, the mobile communication displays a notification requiring the user to unlock the mobile device (i.e., provide user credentials) to open MMS message. Once opened, the MMS message asks for the user to re-enter their random user key to authenticate the MMS message and make the image or video visible. Once the user activates (e.g., "clicks on") the image or video, the MMS message is deemed to be authenticated, which prompts the conversion of the image/video file to the weblink and the extraction of the random user key from the quantum sequence. If the random user key re-entered by the user upon opening the MMS message matches the random user key in the quantum sequence in the weblink, the user is deemed to be authenticated and notification of such, along with the event information, is transmitted to the entity requiring the authentication.

Turning now to the figures, FIG. 1 is a schematic diagram of a system 100 for secure user authentication leveraging random user keys, steganography and quantum computing, in accordance with embodiments of the present invention. The system 100 is implemented within a distributed communication network 110, which may include one or more cellular networks, the Internet, one or more intranets, or the like. The system 100 includes user communication apparatus 200 that is possession of a user 120 desiring to be authenticated for purposes of conducting an event. For purposes of the invention, user communication apparatus 200 may comprise one or more devices. In this regard, user communication apparatus 200 may include a personal computer and a mobile communication device for those embodiments of the invention in which the authentication process is initiated on one device (e.g., the personal computer) and completed on another device (e.g., the mobile communication device, which is configured to receive the MMS message). In other embodiments of the invention, user communication apparatus 200 may be limited to a single mobile communication device, such that the user 120 initiates and completes the authentication process on the mobile communication device.

User communication apparatus 200 includes first computing platform 202 having a memory 204 and one or more first processing devices 206 in communication with first memory 204. First memory 204 may comprise volatile and non-volatile memory, such as read-only and/or random-access memory (RAM and ROM), EPROM, EEPROM, flash cards, or any memory common to computing platforms). Moreover, first memory 204 may be external from the apparatus and, thus, comprise cloud storage, such as provided by a cloud storage service and/or a cloud connection service. First processing device(s) 206 may be an application-specific integrated circuit ("ASIC"), or other chipset, logic circuit, or other data processing device. Additionally, first processing device(s) 206 may execute one or more application programming interface (APIs) (not shown in FIG. 1) that interface with any resident programs, such as authentication application 210 or the like, stored in first memory 204 of first computing platform 202 and any external programs. Further, first processing devices(s) 206 may include various processing subsystems (not shown in FIG. 1) embodied in hardware, firmware, software, and combinations thereof, that enable the functionality of first computing platform 202 and the operability of first computing platform 202 on the distributed computing network 110. For example, processing subsystems allow for initiating and maintaining communications and exchanging data with other networked devices. For the disclosed aspects, processing subsystems of first processing device(s) 206 may include any subsystem used in conjunction with authentication application 210 and related tools, routines, sub-routines, algorithms, sub-algorithms, sub-modules thereof.

First memory 204 stores authentication application 210 that is executable by at least one of the one or more first processing devices 206 and configured to authenticate the user 120 for an event 212 requiring authentication 210. The event may be anything that requires user identity verification, such as, but not limited to, conducting a transaction, accessing a network or service or the like.

In response to the user 120 initiating an event 212 requiring authentication, authentication application 210 is configured to display a random user key prompt 214 that is configured to prompt the user 120 to devise and input a random user key 218-A and, in response to the prompt 214, receive a first user input 216 of the random user key 218-A. The random user key 218-A may be a number of any length or up to a predetermined maximum length as configured by the authentication application 210. While the user 120 may use the same random user key 218-A for multiple, if not all, instances of authentication, the user is encouraged to use a different random user key 218-A for each instance of authentication so as to further heighten security surrounding the authentication process. In response to the user 120 providing the input 216, authentication application 220 is configured to generate and initiate communication of a communication 220, to a quantum computing platform 300, that includes the random user key 218-A and other event information 222 required to perform the event. The event information 222 may be information provided by the user 120 (either preconfigured by the user and stored on the apparatus 200 or at a network entity or provided by the user at the time at which the event is requested) or provided by the entity associated with the event 212.

System 100 additionally includes quantum computing platform 300 that comprises one or more quantum computers having a quantum memory 304 and one or more quantum computing processor devices 306 in communication with the quantum memory 304. Quantum computing platform 300 includes any computer that utilizes the principles of quantum physics to perform computational operations. Several variations of quantum computer design are known, including photonic quantum computing, superconducting quantum computing, nuclear magnetic resonance quantum computing, and/or ion-trap quantum computing. Regardless of the particular type of quantum computing apparatus implementation, all quantum computers encode data onto qubits. Whereas classical computers encode bits into ones and zeros, quantum computers encode data by placing a qubit into one of two identifiable quantum states. Unlike conventional bits, however, qubits exhibit quantum behavior, allowing the quantum computer to process a vast number of calculations simultaneously.

A qubit can be formed by any two-state quantum mechanical system. For example, in some embodiments, a qubit may be the polarization of a single photon or the spin of an electron. Qubits are subject to quantum phenomena that cause them to behave much differently than classical bits. Quantum phenomena include superposition, entanglement, tunneling, superconductivity, and the like.

Two quantum phenomena are especially important to the behavior of qubits in a quantum computing apparatus: superposition and entanglement. Superposition refers to the ability of a quantum particle to be in multiple states at the same time. Entanglement refers to the correlation between two quantum particles that forces the particles to behave in the same way even if they are separated by great distances.

Together, these two principles allow a quantum computer to process a vast number of calculations simultaneously.

In a quantum computer with n qubits, the quantum computer can be in a superposition of up to $2^n$ states simultaneously. By comparison, a classical computer can only be in one of the $2^n$ states at a single time. As such, a quantum computer can perform vastly more calculations in a given time period than its classical counterpart. For example, a quantum computer with two qubits can store the information of four classical bits. This is because the two qubits will be a superposition of all four possible combinations of two classical bits (00, 01, 10, or 11). Similarly, a three-qubit system can store the information of eight classical bits, four qubits can store the information of sixteen classical bits, and so on. A quantum computer with three hundred qubits could possess the processing power equivalent to the number of atoms in the known universe.

In accordance with the present invention, quantum memory 304 stores quantum sequence generator 310 that is configured to generate a quantum sequence 320 including a plurality of generated quantum keys 322, also referred to as qubits (i.e., two or more quantum keys 322/qubits) and the random user key 218-A. Additionally, the quantum sequence 320 may include metadata (not shown in FIG. 1) associated with each of the quantum keys 322, such that, each quantum key 322 in the sequence is followed by its corresponding metadata. In specific embodiments of the invention, the random user key 218-A is embedded within the quantum sequence 320 in-between two quantum keys 322.

Additionally, system 100 includes classical computing platform 400 having a second memory 404 and one or more second computing processor devices 406 in communication with second memory 404. Second memory 404 may comprise volatile and non-volatile memory, such as read-only and/or random-access memory (RAM and ROM), EPROM, EEPROM, flash cards, or any memory common to computing platforms). Moreover, second memory 404 may be external from the platform and, thus, comprise cloud storage, such as provided by a cloud storage service and/or a cloud connection service. Second processing device(s) 406 may be an application-specific integrated circuit ("ASIC"), or other chipset, logic circuit, or other data processing device. Additionally, second processing device(s) 406 may execute one or more application programming interface (APIs) (not shown in FIG. 1) that interface with any resident programs, such as Multimedia Message Service (MMS) message generator 410 or the like, stored in second memory 404 of classical computing platform 400 and any external programs. Further, second processing devices(s) 406 may include various processing subsystems (not shown in FIG. 1) embodied in hardware, firmware, software, and combinations thereof, that enable the functionality of classical computing platform 400 and the operability of classical computing platform 400 on the distributed computing network 110. For example, processing subsystems allow for initiating and maintaining communications and exchanging data with other networked devices. For the disclosed aspects, processing subsystems of second processing device (s) 406 may include any subsystem used in conjunction with MMS message generator 410 and related tools, routines, sub-routines, algorithms, sub-algorithms, sub-modules thereof.

Second memory 404 of classical computing platform 400 stores MMS message generator 410 that is executable by at least one of the second computing processor devices 406 and configured to generate a weblink 420 from the quantum sequence 320 that includes access to the event information 220. In response to generating the weblink 420, MMS message generator 410 is configured to apply steganography 430 to the weblink 420 to create an image or video 440 file that obfuscates, or otherwise hides, the weblink 420. The image or video file may be any image or video file preselected by the user or configured by the MMS message generator 410. In response to creating the image or video file 440, MMS message generator 410 is configured to generate an MMS message 450 that includes the image or video file 440 and initiate communication of the MMS message 450 to a pre-registered mobile communication device (i.e., user communication apparatus 200) of the user 120.

In response to the mobile communication device (i.e., user communication apparatus 200) receiving the MMS message 450 and the user viewing and activating the MMS message, the authentication application 210 is further configured to display another user key prompt 230 that is configured to prompt the user 120 to input the random user key 218 and, in response to the prompt 230, receive a second user input 232 of the random user key 218-B. The receipt of random user key 218-*b* serves to authenticate the MMS message, initiates conversion of the MMS message 450 to the weblink 420 and, upon conversion, extracts the random user key 218-A from the quantum sequence 320 in the weblink 420.

Further, authentication application 210 is configured to authenticate 240 the user 120 for purposes of performing the event 212 based on determining that the random user key 218-A extracted from the weblink 420 (i.e., the random user key 218-A that the user 110 initially inputted) matches 242 the random user key 218-B that the user 120 inputted upon receipt of the MMS message 450.

Referring to FIG. 2, a schematic diagram is depicted of an alternate system 130 for secure user authentication leveraging random user keys, steganography and quantum computing, in accordance with embodiments of the present invention. The system 130 includes the same user communication apparatus 200, quantum computing platform 300 and classical computing platform 400 described above in relation to FIG. 1 and, for purposes of brevity, such description is not repeated in relation to FIG. 2.

According to the embodiments shown in FIG. 2, in response to authenticating the user 120 for performing the event 212, authentication application 210 is further configured to initiate transmission, to an event processing computing platform 500, of a communication 250 that includes weblink 420. In specific embodiments of the invention, the transmission is over a quantum communication channel, which as described infra., provides additional security measures to ensure that the transmission has not been tampered with.

Event processing computing platform 500 includes a third memory 504 and one or more third computing processor devices 506 in communication with third memory 506. Third memory 504 may comprise volatile and non-volatile memory, such as read-only and/or random-access memory (RAM and ROM), EPROM, EEPROM, flash cards, or any memory common to computing platforms). Moreover, third memory 504 may be external from the platform and, thus, comprise cloud storage, such as provided by a cloud storage service and/or a cloud connection service. Third processing device(s) 506 may be an application-specific integrated circuit ("ASIC"), or other chipset, logic circuit, or other data processing device. Additionally, second processing device (s) 506 may execute one or more application programming interface (APIs) (not shown in FIG. 2) that interface with any resident programs, such as event processing application 510 or the like, stored in third memory 504 of event processing computing platform 500 and any external programs. Further, third processing devices(s) 506 may include various processing subsystems (not shown in FIG. 2) embodied in hardware, firmware, software, and combinations thereof, that enable the functionality of event processing computing platform 500 and the operability of event processing computing platform 500 on the distributed computing network 110. For example, processing subsystems allow for initiating and maintaining communications and exchanging data with other networked devices. For the disclosed aspects, processing subsystems of third processing device(s) 506 may include any subsystem used in conjunction with event processing application 510 and related tools, routines, sub-routines, algorithms, sub-algorithms, sub-modules thereof.

Third memory 504 of event processing computing platform 500 stores event processing application 510 that is executable by one or more of the third computing processor devices 506. In response to event processing platform 500 receiving the communication 250, event processing application 510 is configured to filter out the quantum sequence 320 (i.e., quantum keys 322 and random user key 218-A) from the weblink 420 to identify the event information 222 required to perform/conduct the event 212 and, in response, perform the event 212 according to the event information 222. As previously discussed, the event 212 may include, but is not limited to, a transaction or access to a service or network or the like.

As previously discussed, the transmission of communication 250 may be over a quantum communication channel. In specific embodiments of the system 130, in response to determining or receiving notification that the quantum sequence in the weblink has been tampered with (i.e., sequence break 520) during transmission, event processing application 510 is configured to cancel 522 the event 212 and initiate communication of an error message 524 to the user 120, which prompts the user 120 to restart the event initiation process including initiating a new authentication process.

Referring to FIG. 3, a flow diagram is presented of method 600 for secure user authentication from the user's perspective, in accordance with embodiments of the present invention. At Event 602, a user initiates a computer network event requiring authentication and provides event details/information. At Event 604, the user is prompted to enter a random user key (e.g., a random number which may be of a random length) and, in response to the user devising and entering the random user key, at Event 606, the event is initiated by transmitting the random user key and event details to a quantum computer.

Subsequently, at Event 608, a pre-registered mobile communication device associated with the user receives notification of a Multimedia Message Service (MMS) message and, at Event 610, the user unlocks (e.g., facial recognition or passcode input) the mobile communication device and is provided access to the MMS access. At Event 612, the user activates (e.g., "clicks-on") the MMS message, which results in display of a prompt that is configured to request that the user re-enter the random user key (i.e., the same random user key initially devised and entered) and, in response to the prompt, at Event 614, the user re-enters the random user key.

In response to entry of the random user key, at Event 616, the MMS message is deemed to be authenticated and, at Event 618, the user activates (i.e., "clicks-on") the MMS message to authenticate the user (i.e., confirm that the re-entered random user key matches the initially entered random user key).

Once the user is authenticated, at Event 620, the image/video in the MMS message is converted to a weblink and, at Event 622, the weblink is transmitted, over a quantum communication channel, to an event processing entity. If the quantum sequence is broken (i.e., tampered with) during transmission, the event is cancelled and alerts are communicated to the user notifying the user of the need to restart the event process. However, if the transmission occurs without tampering, at Event 624, the event processing entity authenticates the event and the event is performed/conducted (e.g., the transaction is completed, service or network access is provided to the user or the like).

Referring to FIG. 4, a swim-lane flow diagram is presented of a method 700 for secure user authentication leveraging a random user key, steganography and quantum computing, in accordance with embodiments of the present invention. At Event 702, a user initiates an event at a user communication apparatus 200 (e.g., mobile communication device, personal computer or the like) and, at Event 704, the user enters a random user key and submits the event. Submission of the event results in transmission of the random user key and event information to the quantum computing platform 300. Receipt of the random user key and event information by the quantum computing platform prompts, at Event 706, generation of two or more quantum keys, otherwise referred to as qubits, and, at Event 708, generation of a quantum sequence with the random user key embedded in the sequence in-between at least two quantum keys.

In response to generation of the quantum sequence, at Event 710, a classical computing platform 400 creates a weblink that includes the quantum sequence and event information. In response to creating the weblink, at Event 712, steganography is applied to the weblink to generate an image or video file that has the weblink hidden therein. Once the image or video file has been generated, at Event 714, a Multimedia Message Service (MMS) message is generated that comprises the image/video file. Once generated, at Event 716, the MMS message is communicated to a user-registered mobile communication device. As shown in FIG. 4, the MMS message may, in specific embodiments of the invention, be communicated over a quantum communication channel 740, such that any attempt to copy or otherwise tamper with the MMS message during transmission will break the quantum sequence (i.e., entanglement is broken) resulting in failure of the MMS message to be received at the mobile communication device and necessitating that the event be reinitiated with a new authentication process.

In response the mobile communication device (i.e., user communication device 200) receiving the MMS message, at Event 718, the user accesses the MMS message and re-enters the random user key to authenticate the MMS message. In response to MMS message authentication, at Event 720, the weblink in the image/video file extracts the random user key by separating out the quantum keys in the quantum sequence. The quantum key metadata in the weblink is used to identify and separate out the quantum keys from the random user keys. At Event 722, the user is authenticated by matching the re-entered random user key to the random user key extracted from the weblink.

At Event 724, the weblink is communicated to the entity processing platform 500 over a quantum communication channel 750, such that any attempt to copy the quantum keys or otherwise tamper with the transmission will break the quantum sequence (i.e., entanglement is broken) resulting in failure of the weblink to be received at the event processing entity and necessitating that the event be cancelled and an error/message alert being sent to the user requiring re-initiation of the event. In response to the event processing platform 500 receiving the weblink transmission, at Event 726, the quantum keys and random user key are filtered out of the weblink, resulting in the extraction of the event information. At Event 728, the event is authenticated, meaning the event is performed according to the event information extracted from the weblink.

Referring to FIG. 5, a flow diagram is presented of a method 800 for secure user authentication leveraging random user keys, steganography and quantum computing, in accordance with embodiments of the present invention. In response to a user initiating, at a communication device (e.g., mobile device, PC or the like) an event requiring user authentication, at Event 802, the user is prompted to devise and enter a random user key (e.g., characters of any length) and, in response to the prompt, at Event 804, a first user input is received of the random user key, which is transmitted, along with event information to a quantum computing platform. Since the user will subsequently be remembering the user key for re-entry purposes, the user must either remember the random user key or store the random user key.

In response to the quantum computing platform receiving the user key and event information, at Event 806, a quantum sequence is generated that includes at least two subsequently generated quantum keys and the user key. In specific embodiments of the method, each quantum key in the sequence includes metadata that follows each corresponding quantum key in the sequence. Additionally, according to specific embodiments of the method, the user key may be embedded between two quantum keys in the quantum sequence.

In response to generating the quantum sequence, at Event 808 a weblink is generated that includes the quantum sequence and the event information. In response to generating the weblink, at Event 810, steganography is applied to the weblink to create an image or video file, which has the weblink hidden therein. In response to creating the image or video file, at Event 812, a Multimedia Message Service (MMS) message is generated including the image/video file and the MMS message is communicated to user-registered mobile communication device (i.e., a mobile telephone number that the user has previously designated for authentication messaging use). In specific embodiments of the method, the MMS message may be communicated over a secure quantum communication channel.

In response to the mobile communication device receiving the MMS message and the user viewing and activating the MMS message, at Event 814, the user is prompted to re-enter the random user key and, in response to the prompting, at Event 816, a second user input is received of the random user key that serves to authenticate the MMS message. In response to authenticating the MMS message, at Event 818, the MMS message is converted to the weblink and the random user key is extracted from the quantum sequence contained in the weblink. At Event 820, the user is authenticated for conducting the event based on a match between the random user key extracted from the weblink and the random user key in the second user input.

In specific embodiments of the method 800, once the user has been authenticated, the weblink may be communicated to an event processing entity for purposes of authenticating and conducting the event. In such embodiments of the method 800, the weblink may be communicated over a secure quantum communication channel. In response to receiving the weblink, the event processing entity filters out the quantum sequence to render the event information and performs the event according to the extracted event information.

Thus, present embodiments of the invention provide for secure user authentication by leveraging the use of quantum keys, steganography and user-devised random keys/passcodes. User-devised random passcodes limits both the entity's control over the user and potential exposure of the passcode to wrongdoers. From a security standpoint, use of quantum keys and quantum communication channels heightens security during transmission of keys, such that if a wrongdoer would attempt to hack the transmission (i.e., copy the keys or the like), the quantum sequence would break, which would not only prevent the hack but also result in remedial actions, such as preventing events, providing alerts and the like. Further, use of steganography also heightens security by preventing exposure to the keys during transmission and/or while the authentication process is occurring on the display of the user's mobile device.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for secure user authentication, the system comprising:
    a user communication apparatus comprising a first computing platform including a first memory, one or more first processing devices in communication with the first memory, and a user authentication application executable by at least one of the one or more first processing devices and configured to:
        in response to a user initiating an event requiring user authentication, prompt the user to input a random user key, and
        in response to prompting the user, receive a first user input of the random user key and communicate the random user key to a quantum computing platform;
    the quantum computing platform comprising a quantum memory, one or more quantum processors in communication with the quantum memory, and a quantum sequence generator executable by at least one of the quantum processors and configured to:
        in response to receiving the random user key, generate a quantum sequence including a plurality of quantum keys and the random user key; and
    a classical computing platform comprising a second memory, one or more second processing devices in communication with the second memory, and a Multimedia Messaging Service (MMS) message generator executable by at least one of the second computing devices and configured to:
        generate a weblink including the quantum sequence,
        apply steganography to the weblink to create an image file or video file,
        generate an MMS message including the image file or video file, and
        communicate the MMS message to a user-registered mobile communication device,
    wherein in response to the mobile communication device receiving the MMS message, the authentication application is further configured to:

in response to the user viewing and activating the MMS message, prompt the user to input the random user key, in response to prompting the user, receive a second user input of the random user key to authenticate the MMS message, convert the MMS message to the weblink, and extract the random user key from the weblink, and authenticate the user for performing the event based on a match between the random user key extracted from the weblink and the random user key in the second user input.

2. The system of claim 1, wherein the authentication application is further configured to:

in response to authenticating the user for performing the event, transmit the weblink to an event processing entity over a quantum communication channel.

3. The system of claim 2, wherein said generating a weblink comprises generating a weblink that includes the quantum sequence and event information associated with the event, wherein said system further comprises an event processing computing platform comprising a third memory one or more third processing devices in communication with the memory and an event processing application executable by at least one of the one or more third processing devices and configured to:

in response to receiving the weblink, filter out the quantum sequence from the weblink to identify the event information and complete the event based on the event information.

4. The system of claim 3, wherein the event processing application is further configured in response to:

in response to determining that the quantum sequence in the weblink has been broken during transmission, cancel the event and initiate communication of an error message to the mobile communication device that prompts the user to input a different random user key.

5. The system of claim 1, wherein the MMS message generator is further configured to communicate the MMS message to the mobile communication device over a quantum communication channel.

6. The system of claim 5, wherein the authentication application is further configured to:

in response to determining that the quantum sequence in the weblink hidden in the image file or video file of the MMS message has been broken during transmission, initiate communication of an error message to the mobile communication device that prompts the user to input a different random user key.

7. The system of claim 1, wherein the quantum sequence generator is further configured to:

generate the quantum sequence including the plurality a quantum keys, metadata associated with each of the quantum keys and the random user key, wherein (i) each quantum key is followed by corresponding metadata in the quantum sequence, and (ii) the random user key is disposed in-between at least two quantum keys in the quantum sequence.

8. A computer-implemented method for secure user authentication, the method is executed by one or more processing devices and comprises:

in response to a user initiating an event on a communication device that requires user authentication, prompting the user to devise and enter a random user key;

in response to prompting the user to devise and enter the random user key, receiving a first user input of the random user key and communicating the random user key to a quantum computing platform;

in response to the quantum computing platform receiving the random user key, generating a quantum sequence including a plurality of quantum keys and the random user key;

generating a weblink including the quantum sequence;

applying steganography to the weblink to create an image file or video file;

generating an MMS message including the image file or video file, and communicating the MMS message to user-registered mobile communication device;

in response to the mobile communication device receiving the MMS message and the user viewing and activating the MMS message, prompting the user to re-renter the random user key;

in response to prompting the user to re-enter the random user key, receiving a second user input of the random user key to authenticate the MMS message and converting the MMS message to the weblink;

extracting the random user key from the weblink; and authenticating the user for performing the event based on a match between the random user key extracted from the weblink and the random user key in the second user input.

9. The computer-implemented method of claim 8, further comprising:

in response to authenticating the user for performing the event, transmitting the weblink to an event processing entity over a quantum communication channel.

10. The computer-implemented method of claim 9, further comprising:

in response to the event processing entity receiving the weblink, filtering out the quantum sequence from the weblink to identify the event information and complete the event based on the event information.

11. The computer-implemented method of claim 9, wherein said generating a weblink comprises generating a weblink that includes the quantum sequence and event information associated with the event, wherein said system further comprises:

in response to determining that the quantum sequence in the weblink has been broken during transmission, cancelling the event and initiating communication of an error message to the mobile communication device that prompts the user to input a different random user key.

12. The computer-implemented method of claim 8, wherein communicating the MMS message to the mobile communication device further comprises communicating the MMS message to the mobile communication device over a quantum communication channel.

13. The computer-implemented method of claim 12, further comprising in response to determining that the quantum sequence in the weblink hidden in the image file or video file of the MMS message has been broken during transmission, initiating communication of an error message to the mobile communication device that prompts the user to input a different random user key.

14. The computer-implemented method of claim 8, wherein generating the quantum sequence further comprises generating the quantum sequence including the plurality a quantum keys, metadata associated with each of the quantum keys and the random user key, wherein (i) each quantum key is followed by corresponding metadata in the quantum sequence, and (ii) the random user key is disposed in-between at least two quantum keys in the quantum sequence.

15. A computer program product comprising:
a non-transitory computer-readable medium comprising:
a first set of codes for causing a user communication device to in response to a user initiating an event requiring user authentication, (i) prompt the user to devise and enter a random user key, and in response to prompting the user to devise and enter the random user key, (ii) receive a first user input of the random user key and (iii) communicate the random user key to a quantum computing platform;
a second set of codes for causing a quantum computing platform to, in response to the quantum computing platform receiving the random user key, generate a quantum sequence including a plurality of quantum keys and the random user key;
a third set of codes for causing a classical computing platform to, (i) generate a weblink including the quantum sequence, (ii) apply steganography to the weblink to create an image file or video file, (iii) generate an MMS message including the image file or video file, and (iv) communicate the MMS message to the mobile communication device; and
a fourth set of codes for causing a user mobile communication device to, in response to receiving the MMS message and the user viewing and activating the MMS message, (i) prompt the user to re-renter the random user key, in response to prompting the user to re-enter the random user key, (ii) receive a second user input of the random user key to authenticate the MMS message and convert the MMS message to the weblink, (iii) extract the random user key from the weblink, and (iv) authenticate the user for performing the event based on a match between the random user key extracted from the weblink and the random user key in the second user input.

16. The computer program product of claim 15, wherein the fourth set of codes is further configured to cause the user mobile communication device to (v) in response to authenticating the user for performing the event, transmit the weblink to an event processing entity over a quantum communication channel.

17. The computer program product of claim 16, wherein said generating a weblink comprises code for causing the classical computing platform to generate a weblink that includes the quantum sequence and event information associated with the event, wherein the computer-readable medium further comprises a fifth set of codes for causing an event processing entity computing platform to, in response to receiving the weblink, filter out the quantum sequence from the weblink to identify the event information and conduct the event based on the event information.

18. The computer program product of claim 17, wherein the fifth set of codes are further configured to cause the vent processing entity computing platform to, in response to determining that the quantum sequence in the weblink has been broken during transmission, cancel the event and initiate communication of an error message to the mobile communication device that prompts the user to input a different random user key.

19. The computer program product of claim 16, wherein the third set of codes are further configured to cause the classical computing platform to (v) communicate the MMS message to the mobile communication device over a quantum communication channel, and (vi) in response to determining that the quantum sequence in the weblink hidden in the image file or video file of the MMS message has been broken during transmission, initiate communication of an error message to the mobile communication device that prompts the user to input a different random user key.

20. The computer program product of claim 16, wherein the second set of codes are further configured to cause the quantum computing platform to generate the quantum sequence including the plurality a quantum keys, metadata associated with each of the quantum keys and the random user key, wherein (i) each quantum key is followed by corresponding metadata in the quantum sequence, and (ii) the random user key is disposed in-between at least two quantum keys in the quantum sequence.

\* \* \* \* \*